(12) United States Patent
Landrith et al.

(10) Patent No.: US 7,452,024 B2
(45) Date of Patent: Nov. 18, 2008

(54) LATCHING ARRANGEMENT FOR A TONNEAU COVER

(75) Inventors: Lawrence G. Landrith, Troy, MI (US); Scott E. Cumberland, South Lyon, MI (US); Malcolm J. Zack, Thornhill (CA)

(73) Assignee: Magna International Inc., Aurora, Ontario (CA)

( * ) Notice: Subject to any disclaimer, the term of this patent is extended or adjusted under 35 U.S.C. 154(b) by 301 days.

(21) Appl. No.: 11/295,009

(22) Filed: Dec. 6, 2005

(65) Prior Publication Data

US 2006/0119127 A1 Jun. 8, 2006

Related U.S. Application Data

(60) Provisional application No. 60/633,878, filed on Dec. 6, 2004.

(51) Int. Cl.
*B60P 7/02* (2006.01)
(52) U.S. Cl. .................................. 296/100.04
(58) Field of Classification Search ............ 296/100.04, 296/100.01, 100.02, 100.03
See application file for complete search history.

(56) References Cited

U.S. PATENT DOCUMENTS

| | | | | |
|---|---|---|---|---|
| 4,199,188 A | * | 4/1980 | Albrecht et al. | 296/100.04 |
| 4,406,493 A | * | 9/1983 | Albrecht et al. | 296/100.04 |
| 4,909,561 A | * | 3/1990 | Lovaas | 296/100.04 |
| 5,052,739 A | * | 10/1991 | Irwin | 296/37.6 |
| 5,067,766 A | * | 11/1991 | Lovaas | 296/100.04 |
| 6,076,881 A | * | 6/2000 | Tucker | 296/100.07 |
| 6,254,169 B1 | * | 7/2001 | Arthur | 296/100.07 |
| 6,273,491 B1 | | 8/2001 | Bath et al. | |
| 6,497,445 B1 | | 12/2002 | Combs, III | |
| 6,520,558 B1 | | 2/2003 | Katterloher et al. | |
| 7,066,523 B2 | * | 6/2006 | Verduci et al. | 296/100.06 |
| 7,188,888 B2 | * | 3/2007 | Wheatley et al. | 296/100.04 |
| 7,258,387 B2 | * | 8/2007 | Weldy | 296/100.07 |

* cited by examiner

*Primary Examiner*—H Gutman
(74) *Attorney, Agent, or Firm*—Clark Hill PLC (57) ABSTRACT

A tonneau cover assembly is provided for a bed of a pickup truck having a pair of spaced apart sidewalls. The tonneau cover assembly includes an elongated rail adapted to be fixedly secured to each of the pair of spaced apart sidewalls. Each of the elongated rails includes a bottom member having at least one opening extending therethrough. A panel includes opposing ends slidably coupled to the elongated rails for selectively covering the bed. A retention member is fixedly secured to each of the opposing ends of the panel for slidingly engaging the elongated rails. Each of the retention members is receivable within the opening along one of the elongated rails to retain the panel in place along the elongated rails.

15 Claims, 8 Drawing Sheets

LATCHING ARRANGEMENT FOR A TONNEAU COVER

CROSS REFERENCE TO RELATED APPLICATION

This application claims priority to and all the benefits of U.S. Provisional Application Ser. No. 60/633,878, filed on Dec. 6, 2004, and entitled "Latching Arrangement for a Tonneau Cover."

FIELD OF THE INVENTION

The invention relates to tonneau covers for pickup trucks. More particularly, this invention relates to a latching arrangement for retaining a tonneau cover in place above a pickup truck bed.

DESCRIPTION OF RELATED ART

Pickup trucks include a bed having a front wall abutting a passenger cab, a pair of spaced apart sidewalls extending rearwards from the front wall, and a tailgate extending between the pair of spaced apart sidewalls. The bed is generally exposed to the elements, that is, to moisture, wind, and debris. As a result, the contents of the bed are also exposed to the elements and, therefore, subject to damage therefrom. The exposed bed also produces wind resistance or drag during pickup truck operation, which adversely affects fuel economy of the pickup truck.

Protective covers, commonly known as tonneau covers, have been developed for pickup trucks to prevent damage to the contents of the bed and to increase pickup truck fuel economy. Tonneau covers may be either soft or hard. Soft tonneau covers, which are formed from a fabric material, are stretched across the bed and secured to each of the sidewalls. Hard tonneau covers, which are formed from metal, plastic, fiberglass or a similar hard structural material, are typically pivotally mounted to the bed using one or more hinge mechanisms.

Hard tonneau covers commonly include a latch mechanism for selectively locking the hard tonneau cover in place against the pair of sidewalls and over the bed. Typically, the latch mechanism is mounted entirely inside the bed such that the tailgate must be opened in order to access the latch. The latch mechanism provides security for articles stored within the bed. In addition, the latch mechanism prevents the tonneau cover from inadvertently opening during pickup truck operation.

If the latch mechanism fails, however, the tonneau cover is free to open. Thus, there is a need for a latching arrangement for retaining the tonneau cover in place over the pickup truck bed in the event of failure of a main latch mechanism.

SUMMARY OF THE INVENTION

According to one aspect of the invention, a tonneau cover assembly is provided for a bed of a pickup truck having a pair of spaced apart sidewalls. The tonneau cover assembly includes an elongated rail adapted to be fixedly secured to each of the pair of spaced apart sidewalls. Each of the elongated rails includes a bottom member having at least one opening. A panel includes opposing ends slidably coupled to the elongated rails for selectively covering a portion of the bed. A retention member is fixedly secured to each of the opposing ends of the panel for slidingly engaging the elongated rails. Each of the retention members is receivable within the opening along one of the elongated rails to retain the panel in place along the elongated rails.

According to another aspect of the invention, a tonneau cover assembly is provided for a bed of a pickup truck having a pair of spaced apart sidewalls. The tonneau cover assembly includes an elongated rail adapted to be fixedly secured to each of the pair of spaced apart sidewalls. A panel having opposing ends is slidably coupled to each of the elongated rails for selectively covering a portion of the bed. The panel includes a striker extending out therefrom. A latch is rotatably mounted to at least one of the elongated rails and engageable with the striker to lock the panel in place along the elongated rails.

According to still another aspect of the invention, a tonneau cover assembly is provided for a bed of a pickup truck having a pair of spaced apart sidewalls. The tonneau cover assembly includes an elongated rail adapted to be fixedly secured to each of the pair of spaced apart sidewalls. Each of the elongated rails includes a bottom member having at least one opening extending therethrough. A panel having a pair of spaced apart retention members slidingly engages the respective elongated rails. Each of the retention members is receivable within one of the openings along each elongated rail. The panel also includes a striker extending out therefrom. A latch is rotatably mounted to at least one of the elongated rails and is engageable with the striker to provide a primary latch for selectively locking the panel in place along the elongated rails. The retention members and the respective openings along each of the elongated rails forms a secondary latch for retaining the panel in place along the elongated rails when the primary latch is disengaged.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
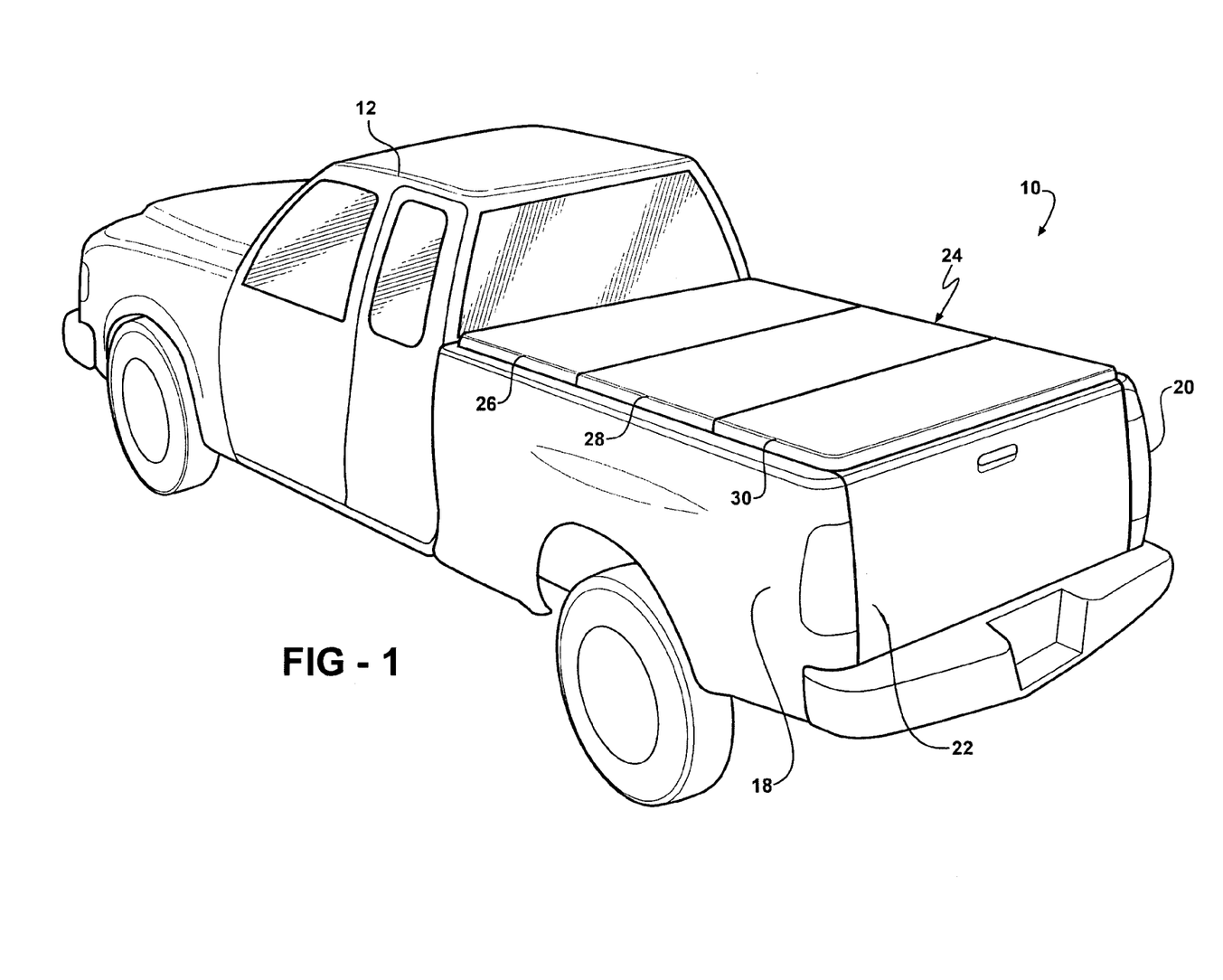
FIG. 1 is a rear perspective view of a pickup truck including a tonneau cover assembly, having front, middle, and rear panels, covering a bed.
Figure 2:
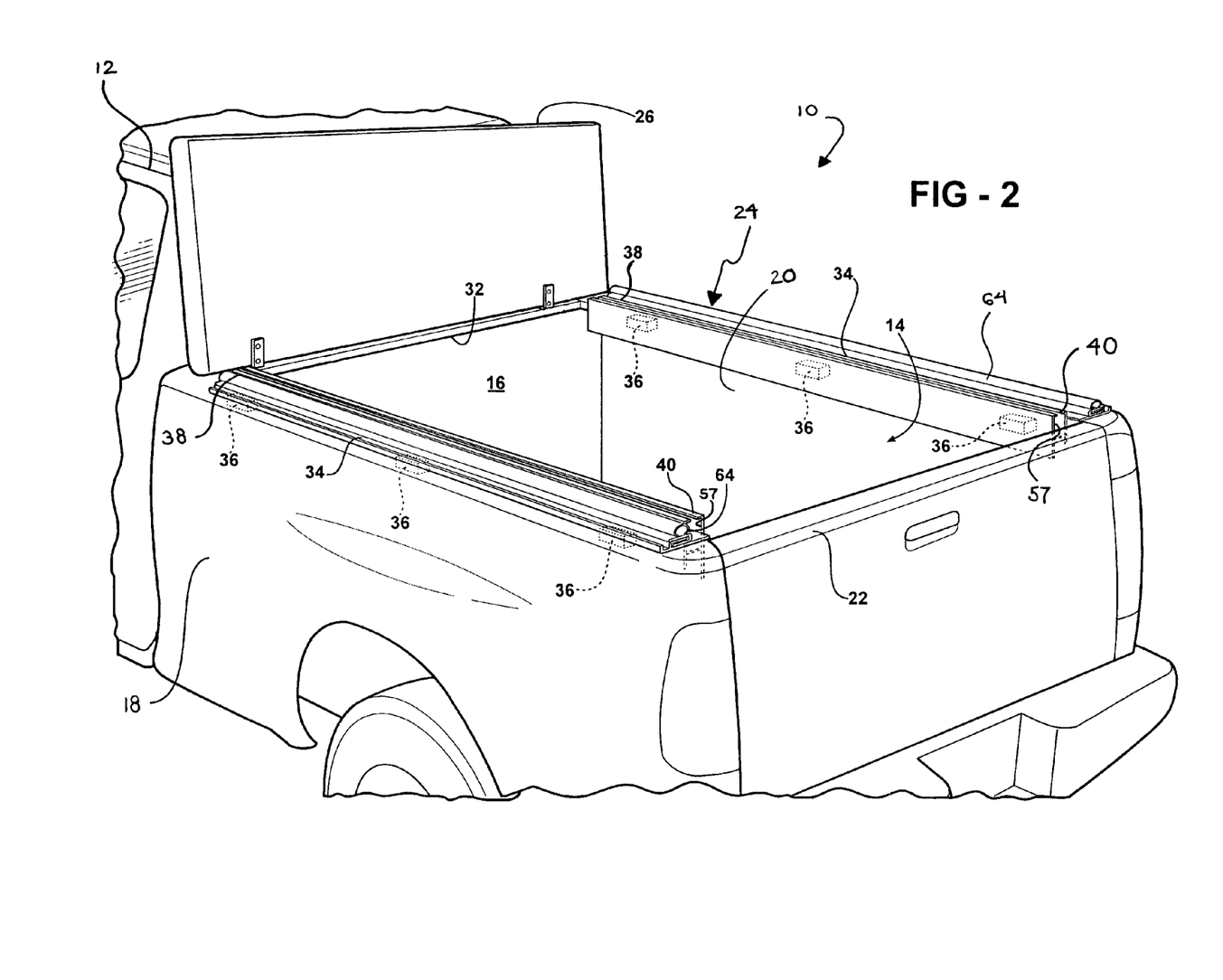
FIG. 2 is a fragmentary, rear perspective view of the pickup truck including an elongated rail of the tonneau cover assembly fixedly secured to each of a pair of spaced apart sidewalls.

Referring to FIGS. 1 and 2, a pickup truck, generally shown at 10, includes a passenger cab 12 and a bed 14 extending rearwards therefrom. The bed 14 includes a front wall 16 abutting the passenger cab 12, a pair of spaced apart, longitudinal sidewalls 18, 20 extending rearwards from the front wall 16, and a tailgate 22 extending between the pair of sidewalls 18, 20. The tailgate 22 selectively pivots relative to the pair of sidewalls 18, 20 to allow access to the bed 14.

A tonneau cover assembly, generally indicated at 24, is disposed over the bed 14 to protect articles stored therewithin from the elements, i.e., moisture, wind, and debris. The tonneau cover assembly 24 includes a front panel 26, a middle panel 28, and a rear panel 30. The panels 26, 28, 30 are overflush with the pair of sidewalls 18, 20. Preferably, the panels 26, 28, 30 are formed from a composite material. It is, however, appreciated that the panels 26, 28, 30 may be formed from metal, plastic, structural foam, or a combination thereof.

Referring to FIG. 2, a header 32 is fixedly secured above the front wall 16 of the bed 14. The front panel 26 is pivotally hinged to the header 32 for movement relative thereto. A tray or basket (not shown) may be positioned inside the bed 14 adjacent to the front wall 16 for storage of smaller items. The tray or basket is selectively closed by the front panel 26.

An elongated rail 34 extends along each of the pair of sidewalls 18, 20 and is fixedly secured thereto by a plurality of clamps 36. Each of the elongated rails 34 includes a front end 38 abutting the header 32 and an opposing back end 40. Preferably, the header 32 and the elongated rails 34 are extruded aluminum components. It is, however, contemplated that the header 32 and the elongated rails 34 may be formed from any of various materials.

Figure 3:
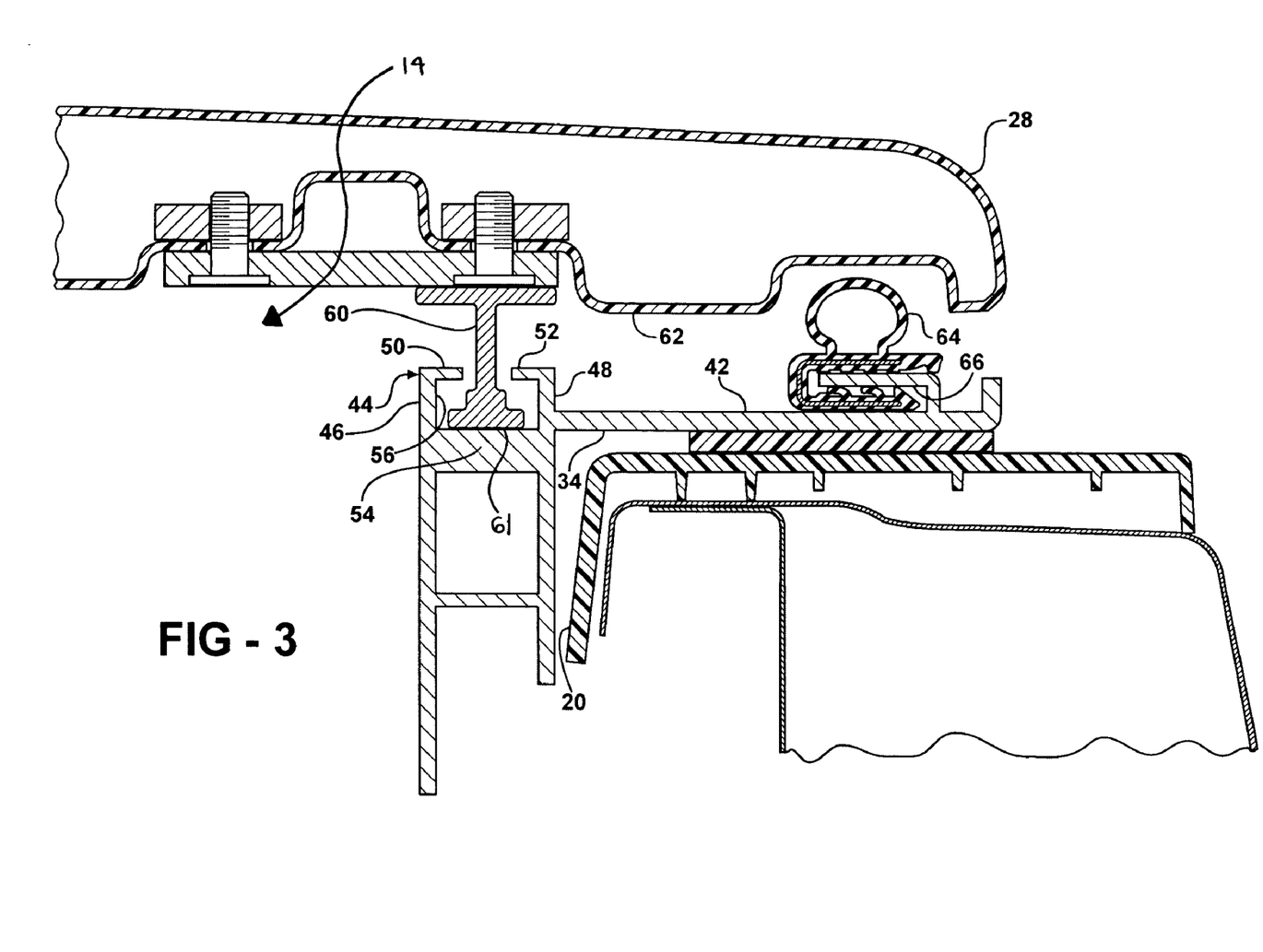
FIG. 3 is a cross-sectional view showing a retention member fixedly secured to the middle panel and disposed within a channel along one of the elongated rails.
Figure 4:
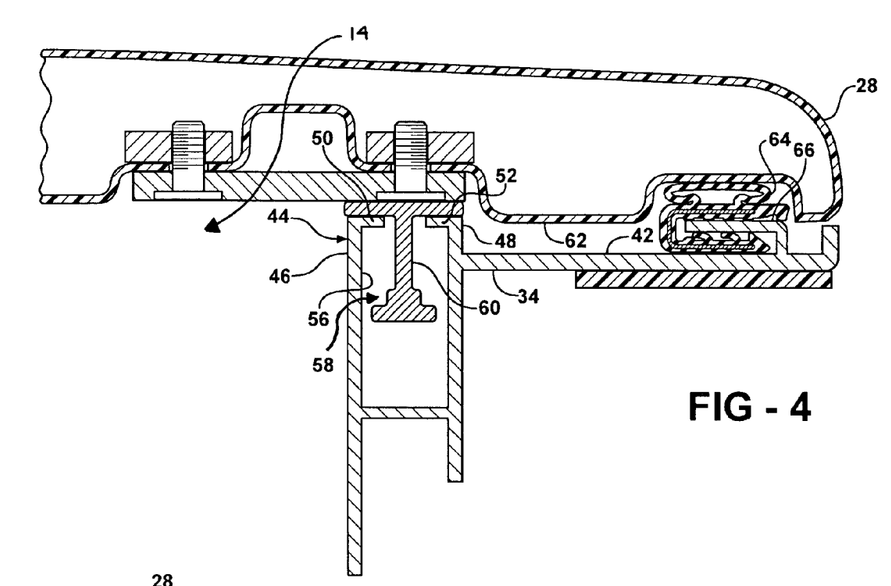
FIG. 4 is a cross-sectional view showing the retention member received within an opening in a bottom surface of one of the elongated rails for securing the middle panel in place along the elongated rail.

Referring to FIGS. 3 and 4, each of the elongated rails 34 includes a sidewall portion 42 disposed above each of the pair of sidewalls 18, 20 (one shown), and a track portion, generally indicated at 44, extending out from the sidewall portion 42 into the bed interior. The track portion 44 includes opposing side members 46, 48 having respective inwardly extending ends 50, 52. A bottom member 54 extends between the opposing side members 46, 48. The side members 46, 48 and bottom member 54 define a channel 56 having an open end 57, shown in FIG. 2, at the back end 40 of each elongated rail 34. The bottom member 54 includes a plurality of spaced apart openings 58 (one of which is shown in FIG. 5) spaced apart from one another along each of the elongated rails 34.

Referring to FIGS. 2 through 4, an elongated seal 64 is fixedly secured to a flange 66 extending out from the sidewall portion 42 of each elongated rail 34. The seal 64, which extends between the front 38 and back 40 ends of each elongated rail 34, sealingly engages the front 26, middle 28, and rear 30 panels in order to prevent moisture from entering the bed 14 and damaging the contents thereof.

Figure 5:
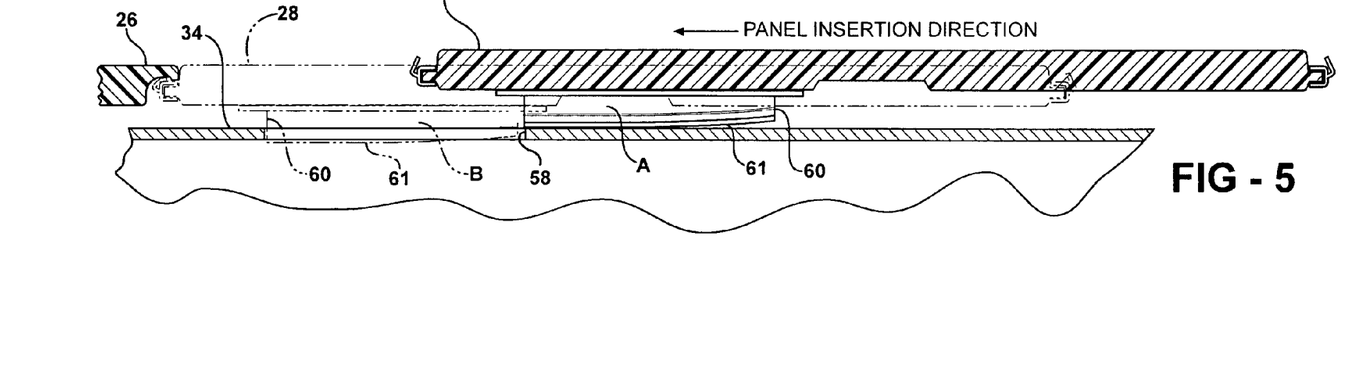
FIG. 5 is a fragmentary, side view of the tonneau cover assembly including the retention member in slidable engagement with one of the elongated rails for insertion into the corresponding opening in the bottom surface of one of the elongated rails.

Referring to FIGS. 3 through 5, the middle panel 28 is slidably coupled to the elongated rails 34. It is appreciated that although only the middle panel 28 is shown and described from this point forward, the following description applies equally to the rear panel 30. A pair of spaced apart retention members or retention members 60 (one shown) is fixedly secured to and extends out from a bottom surface 62 of the middle panel 28. Each retention member 60 is aligned with the open end 57 of one of the elongated rails 34 and received within the channel 56 thereof. The retention members 60 each have an arcuate or contoured bottom edge 61 that slides along the bottom member 54 of each of the elongated rails 34.

As the retention members 60 slide within the respective channels 56, the middle panel 28 moves along the elongated rails 34. Each retention member 60 is selectively received within one of the spaced apart openings 58, as shown in FIG. 5, to secure the middle panel 28 in place along the elongated rails 34 and over a portion of the bed 14. When the retention members 60 are disposed within the respective openings 58, the middle panel 28 is not able to move relative to the elongated rails 34. It is appreciated that the particular shape of the retention members 60 may vary depending on the particular size of the openings 58.

Figure 6:
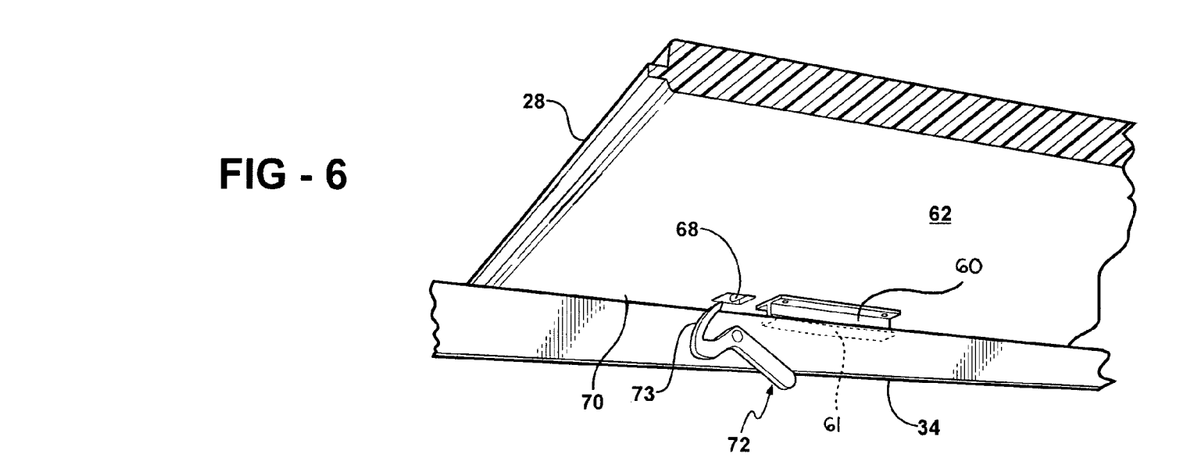
FIG. 6 is a fragmentary, perspective view of the tonneau cover assembly including a striker extending out from a bottom surface of the middle panel, and a latch rotatably mounted along one of the elongated rails.
Figure 7:
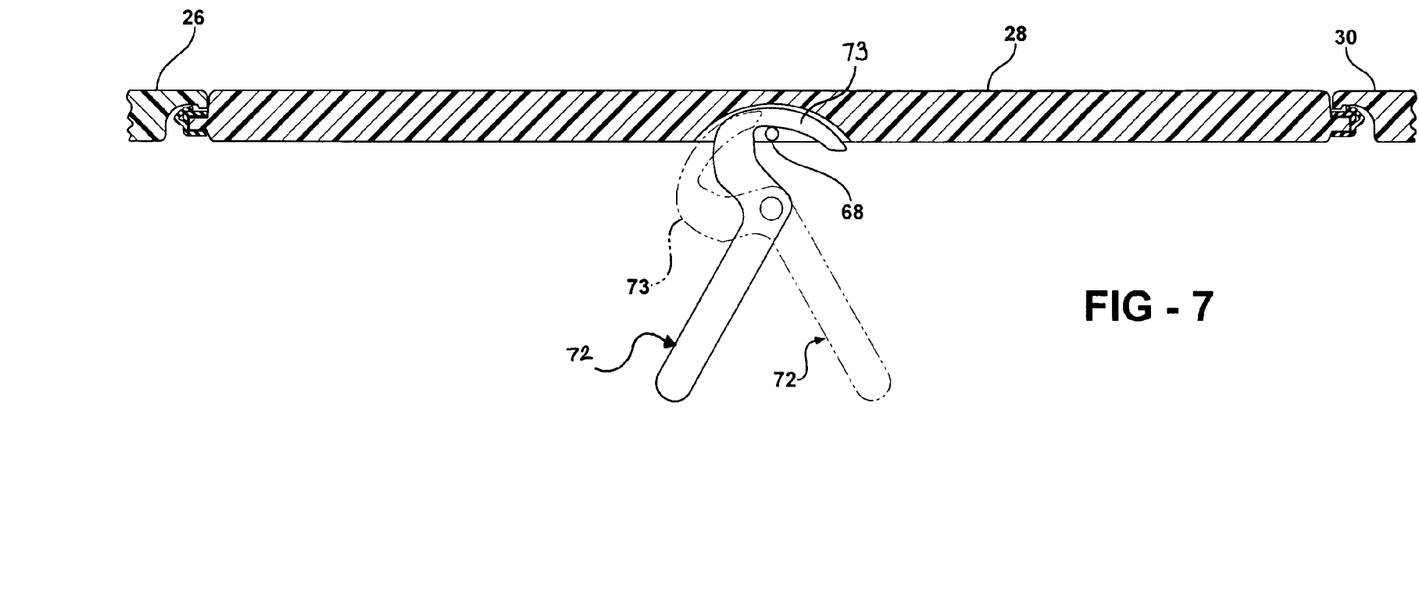
FIG. 7 is a side view of the middle panel including the striker engaged by the latch.

Referring to FIGS. 6 and 7, at least one striker 68 is fixedly secured to the bottom surface 62 of the middle panel 28. In a preferred embodiment, the middle panel 28 includes two strikers, one at each opposing end 70. When the retention members 60 are received within the respective openings 58 along each elongated rail 34, each striker 68 overlies a latch, generally indicated at 72. The latch 72 includes a cam lever 73 rotatably mounted along at least one of the elongated rails 34. In the preferred embodiment, each of the elongated rails 34 includes one latch 72 rotatably mounted thereto for engagement with one of the strikers 34. The user manually urges the cam lever 73 into engagement with the striker 68 to lock the middle panel 28 in place along the elongated rails 34 and over the bed 14.

It is appreciated that the latch 72 acts as a primary latch for the tonneau cover assembly 24. The above-described elongated rails 34 and retention members 60 function as a secondary latch for retaining the middle panel 28 in place along the elongated rails 34 in those instances in which the latch 72 is not actuated due to either user forgetfulness or primary latch malfunction. Thus, the above-described dual latch arrangement prevents inadvertent movement of the middle panel 28 relative to the pair of sidewalls 18, 20 of the bed 14.

To install the middle panel 28, a user aligns the retention members 60 extending out from the bottom surface 62 of the middle panel 28 with the back end 40 of the respective elongated rails 34. A cross member (not shown) may be fixed between the elongated rails 34 during installation to support the middle panel 28. The user then guides the middle panel 28 forward so that each retention members 60 enters the channel 56 of one of the elongated rails 34 for sliding engagement therewith, as shown at A in FIG. 5. Next, the user slides the middle panel 28 along the elongated rails 34 towards the front end 38 thereof until each retention member 60 is received within one of the openings 58 along each elongated rail 34, as shown at B in FIG. 5. When the retention members 60 are received within the respective openings 58, the middle panel 28 is secured in place relative to the elongated rails 34 and retained over the bed 14. The user then manually actuates the latch 72 into engagement with the striker 68 to lock the middle panel 28 in place.

To remove the middle panel 28, the user first releases the latch 72 (if it has been engaged). The user then slightly lifts the middle panel 28 and pulls it rearwards so that the retention members 60 are elevated out of the respective openings 58 and into contact with the bottom member 54 of each elongated rail 34. The arcuate surface 61 of each retention member 60 assists the removal thereof from the openings 58. The middle panel 28 is then pulled rearwards towards the back end 40 of each elongated rail 34 until the retention members 60 exit through the respective channels 56 to disengage the respective elongated rails 34.

As stated above, the rear panel 30 is installed and removed in the same fashion. When installed, the middle 28 and rear 30 panels, like the front panel 26, are overflush with the sidewalls 18, 20.

Figure 8:
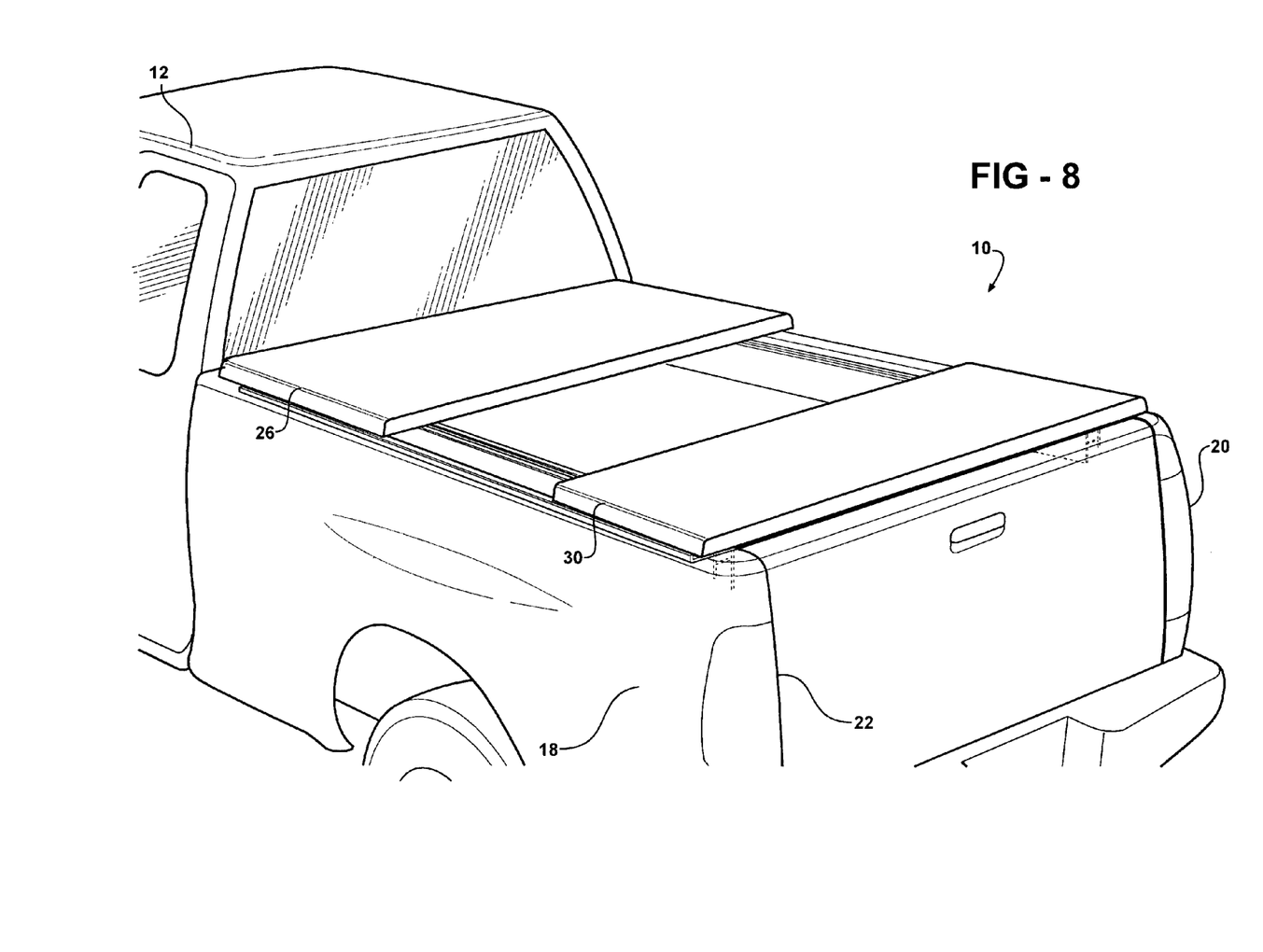
FIG. 8 is a fragmentary, rear perspective view of the pickup truck including the tonneau cover assembly having only the front and rear panels in position for defining an open storage space therebetween.
Figure 9:
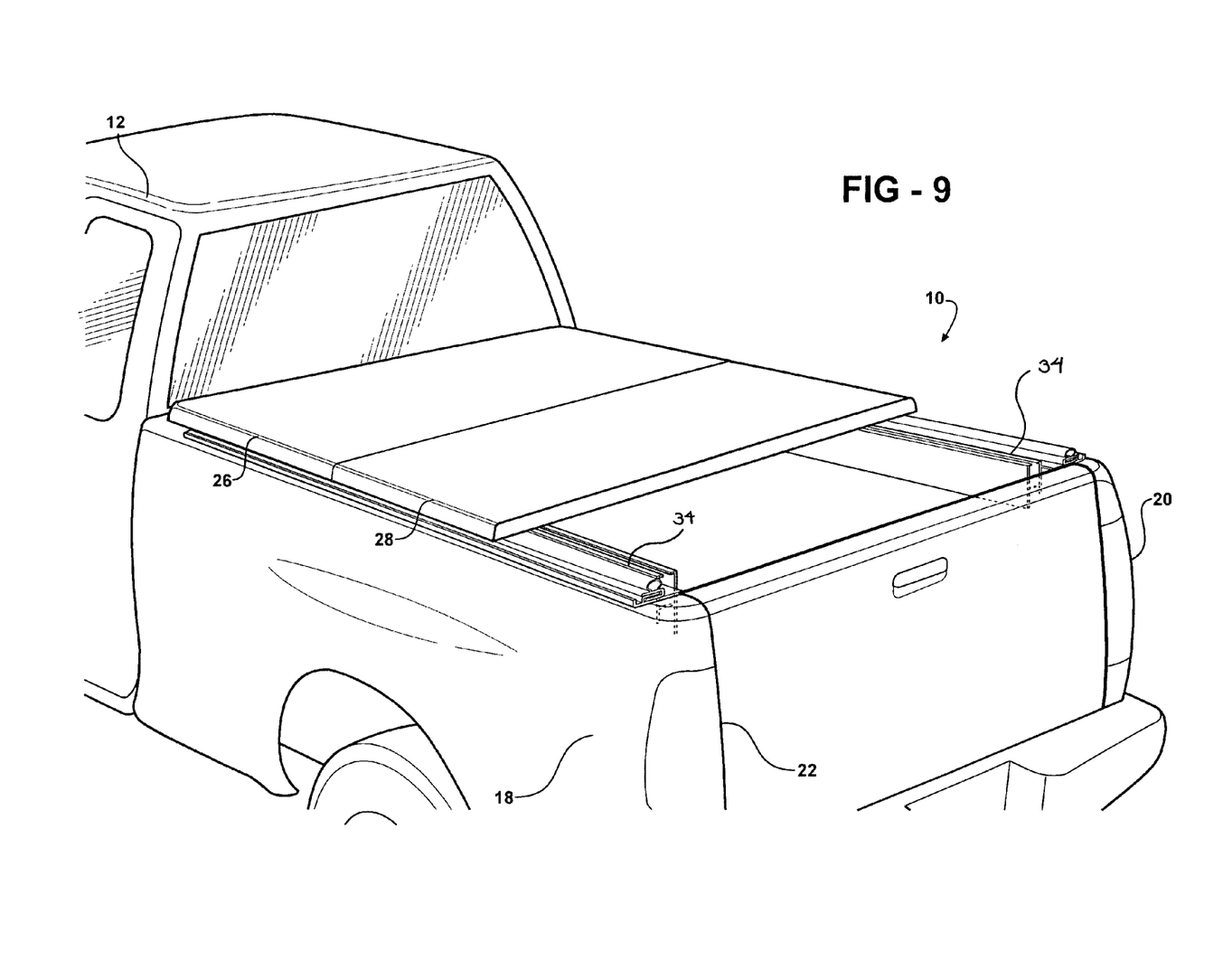
FIG. 9 is a fragmentary, rear perspective view of the pickup truck including the tonneau cover assembly having the front and middle panels in position for defining an open storage space therebehind.
Figure 10:
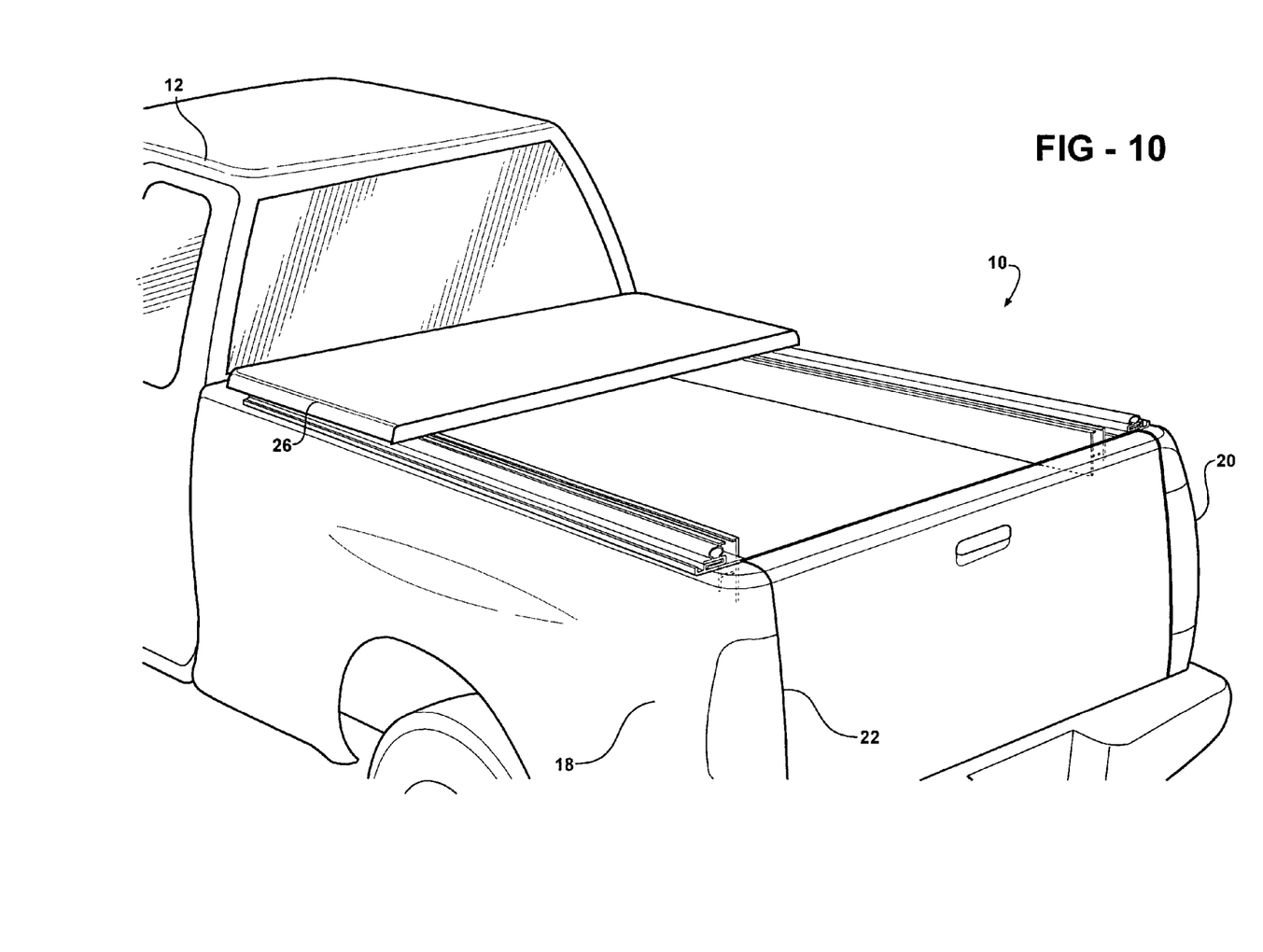
FIG. 10 is a fragmentary, rear perspective view of the pick up truck including the tonneau cover assembly having the front panel in position for defining an open storage space therebehind.

As an added benefit, the above-described system provides users with a great amount of flexibility in configuring the panels 26, 28, 30 of the tonneau cover assembly 24. For example, either of the middle 28 or rear 30 panels may be individually removed from the pickup truck 10 in order to accommodate articles or varying sizes. For example, if the user desires to store a taller item, such a plant, in the bed 14, the user may remove the middle panel 28 and install only the rear panel 30 to provide an open storage space, as shown in FIG. 8. Thus, the taller item is allowed to extend through the open storage space created by the removal of the middle panel 28. At the same time, the rear panel 30 is positioned to protect additional articles stored in the bed 14. Similarly, rear panel 30 may be removed and only the middle panel 28 installed to provide an open storage space behind the middle panel 28, as shown in FIG. 9. Further, the middle 28 and rear 30 panels may both be removed, as shown in FIG. 10, in order to accommodate even larger articles.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed:

1. A tonneau cover assembly for a bed of a pickup truck having a pair of spaced apart sidewalls, said tonneau cover assembly comprising:
   an elongated rail adapted to be fixedly secured to each of the pair of spaced apart sidewalls, each of said elongated rails having a bottom member defining at least one opening therethrough;
   a panel having opposing ends slidably coupled to said elongated rails for selectively covering a portion of the bed; and
   a retention member fixedly secured to each of said opposing ends of said panel for slidingly engaging said elongated rails, each of said retention members receivable within said opening along one of said elongated rails to retain said panel in place along said elongated rails.

2. A tonneau cover assembly as set forth in claim 1 wherein each of said elongated rails includes a track portion slidably receiving one of said retention members.

3. A tonneau cover assembly as set forth in claim 2 wherein said track portion includes a pair of spaced apart side members extending out from said bottom member and defining a channel for receiving said retention member.

4. A tonneau cover assembly as set forth in claim 3 including a seal fixedly secured to each of said elongated rails and extending at least partially therealong for selective sealing engagement with said panel.

5. A tonneau cover assembly as set forth in claim 4 including a striker extending out from said panel.

6. A tonneau cover assembly as set forth in claim 5 including a latch rotatably mounted along said elongated rail and engageable with said striker for locking said panel against the sidewalls.

7. A tonneau cover assembly as set forth in claim 6 wherein each of said retention members includes an arcuate bottom edge for facilitating removal of said retention member from said respective opening.

8. A tonneau cover assembly for a bed of a pickup truck having a pair of spaced apart sidewalls, said tonneau cover assembly comprising:
   an elongated rail adapted to be fixedly secured to each of the pair of spaced apart sidewalls;
   a panel having opposing ends slidably coupled to each of said elongated rails for selectively covering a portion of the bed, said panel having a striker extending out therefrom; and
   a latch rotatably mounted to at least one of said elongated rails and engageable with said striker to lock said panel in place along said elongated rails.

9. A tonneau cover assembly as set forth in claim 8 wherein each of said elongated rails includes a track portion slidably receiving a portion of said panel.

10. A tonneau cover assembly as set forth in claim 9 including a seal fixedly secured to each of said elongated rails and extending at least partially therealong for selective sealing engagement with said panel.

11. A tonneau cover assembly for a bed of a pickup truck having a pair of spaced apart sidewalls, said tonneau cover assembly comprising:
    an elongated rail fixedly secured to each of the pair of spaced apart sidewalls, each of said elongated rails having a bottom member defining at least one opening;
    a panel having a pair of spaced apart retention members slidingly engageable with said elongated rails and receivable within said opening along each of said elongated rails, said panel including a striker extending out therefrom; and
    a latch rotatably mounted to at least one of said elongated rails and engageable with said striker to provide a primary latch for selectively locking said panel in place along said elongated rails;
    said retention members and said respective openings along said elongated rails forming a secondary latch for retaining said panel in place along said elongated rails when said primary latch is disengaged.

12. A tonneau cover assembly as set forth in claim 11 wherein each of said elongated rails includes a track portion slidably receiving one of said respective retention members.

13. A tonneau cover assembly as set forth in claim 12 wherein said track portion includes a pair of spaced apart side members extending out from said bottom member and defining a channel for receiving said retention members.

14. A tonneau cover assembly as set forth in claim 13 wherein each of said retention members includes an arcuate bottom surface for facilitating removal of said retention member from said respective opening.

15. A tonneau cover assembly as set forth in claim 14 including a seal fixedly secured to each of said elongated rails and extending at least partially therealong for selective sealing engagement with said panel.

* * * * *